Dec. 24, 1968   J. J. ZICCARDI   3,417,832
WHEELED VEHICLE SELECTIVELY CONVERTIBLE TO ENDLESS TRACK VEHICLE
Filed Oct. 24, 1966   3 Sheets-Sheet 1

INVENTOR.
John J. Ziccardi
BY William B. Jaspert
Attorney

Dec. 24, 1968 J. J. ZICCARDI 3,417,832
WHEELED VEHICLE SELECTIVELY CONVERTIBLE TO ENDLESS TRACK VEHICLE
Filed Oct. 24, 1966 3 Sheets-Sheet 3

INVENTOR.
BY John J. Ziccardi
William B. Jaspert
Attorney.

United States Patent Office 3,417,832
Patented Dec. 24, 1968

3,417,832
WHEELED VEHICLE SELECTIVELY CONVERTIBLE TO ENDLESS TRACK VEHICLE
John J. Ziccardi, Evans City, Pa., assignor of fifty percent to William B. Jaspert, Pittsburgh, Pa.
Filed Oct. 24, 1966, Ser. No. 589,001
3 Claims. (Cl. 180—9.3)

ABSTRACT OF THE DISCLOSURE

This invention relates to new and useful improvements in articulated tracked vehicles of the kind employing endless traction chains, and it is among the objects thereof to provide such a vehicle in which the tracks are mounted on articulated housings or legs relatively movable to the vehicle body to place the traction chains in different elevated positions which enables the vehicle to move through obstacle courses and bogs of swampy terrain.

---

It is a further object of the invention to provide an articulated tracked vehicle of the above-designated character which employs regular vehicle wheels for high speed travel on highways and other unobstructed surfaces.

It is a further object of the invention to provide an articulated tracked vehicle capable of use in combination with other vehicles such as mine cars for loading such cars in coal mines. The body of such loading devices may be equipped with coal cutting and/or loading machinery.

It is generally an object of the invention to provide articulated tracked vehicles capable of lifting itself by its boot straps, as it were, to provide ground clearance by which it may perform maneuvers to overcome obstacles, such vehicles being particularly useful for warfare and construction work.

The invention primarily consists of the construction and manipulation of the articulated tracks and not with any specific means for motivating either the track articulating mechanism of the wheels by which the vehicle may be propelled.

The invention will become more evident from a consideration of the accompanying drawings constituting a part hereof in which like reference characters designate like parts and in which:

FIGURE 1 is a side elevational view diagrammatically illustrating an articulated tracked vehicle embodying the principles of this invention;

FIGURE 2 an end elevational view thereof;

FIGURE 3 a top plan of a portion of the vehicle illustrating the chain drive and track and articulating mechanism taken along the line 3—3 of FIGURE 4;

FIGURE 4 a side elevational view of a modified form of articulated tracked vehicle;

FIGURE 5 an end elevation, patrially in cross section, taken along the line 5—5 of FIGURE 4;

Figure 8:
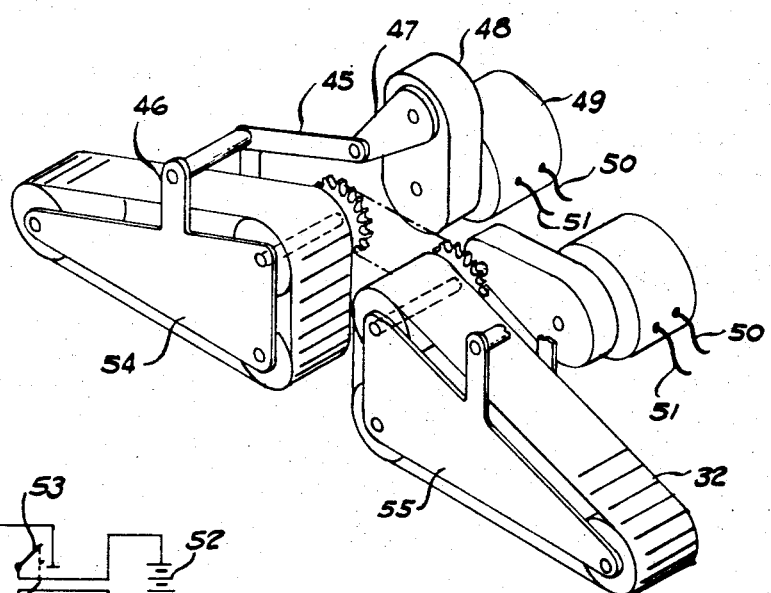
FIGURE 8 is a view in perspective of a pair of tracks and drive mechanism therefor, together with a remote control to enable the use of the vehicle as a toy.
Figure 9:
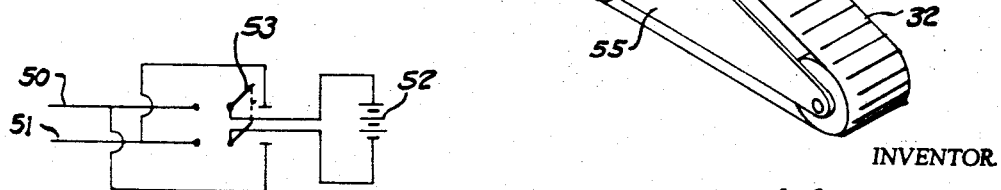

FIGURE 9 a diagrammatic view of the control circuit for the remote control of the operating motors of the device of FIGURE 8; and, FIGURES 10 through 17 are side elevational views of the vehicle in relation to an obstacle diagrammatically illustrating the maneuverability possible by means of the articulated tracks.

Figure 1:
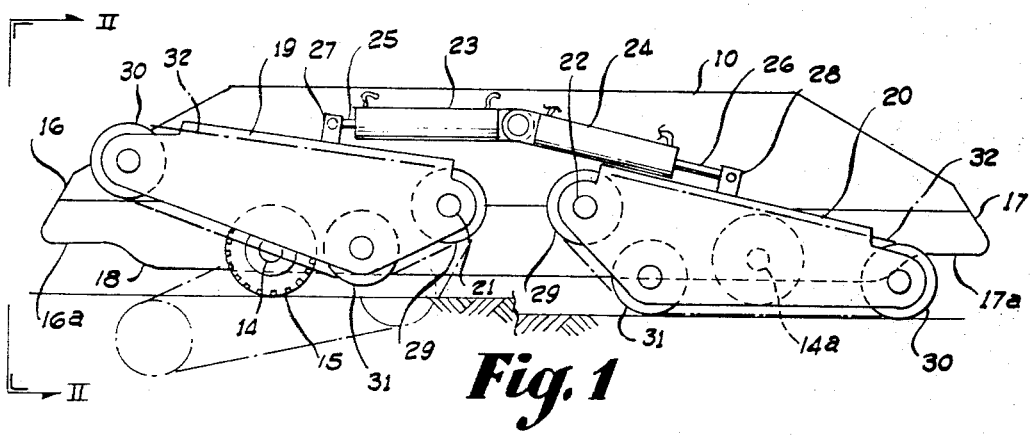
Figure 2:
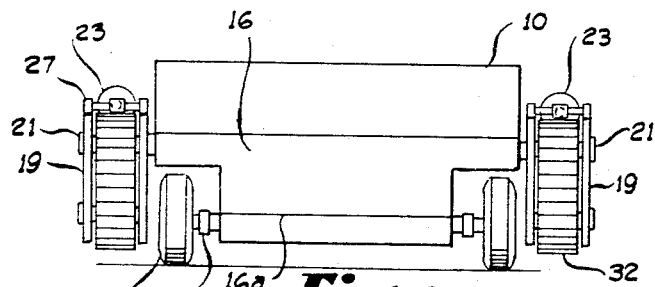
Figure 3:
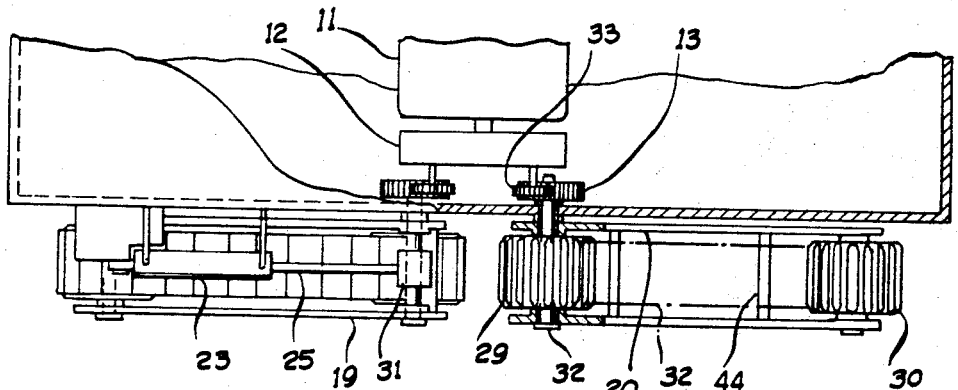

With reference to FIGURE 1 of the drawing, the numeral 10 designates a vehicle body that houses a motor or engine such as the engine 11, FIGURE 3, and a transmission 12, FIGURE 3, together with the drive gears 13. The vehicle is mounted on wheeled axis 14 and 14a on which are mounted traction wheels 15 supplied with heavy duty pneumatic tires by means of which the vehicle may be driven over highways or smooth road surfaces at relatively high speed. The connection through a differential and transmission device between the wheels 15 and the engine 11, together with the steering mechanism and controls, are not shown and may be of conventional construction and design, which is no part of the present invention.

As shown in FIGURE 1, the front and rear of the vehicle have a nose portion 16 and 17 with a flat seating surface designated by the numerals 16a and 17a that terminates in a rounded shoulder 18. Traction housings designated by the numerals 19 and 20, of which there are four, are pivotally mounted to the vehicle body at 21 and 22, FIGURE 1, so they can be articulated, that is subjected to angular movement about their pivot points within the limits of the actuating mechanism which may consist of a pair of hydraulic actuators 23 and 24, the piston rods 25 and 26 of which are connected to brackets 27 and 28, welded or otherwise secured to the top of the traction housings 19 and 20.

As shown in FIGURE 1, the vehicle has a pair of its road wheels 15 in contact with the ground on the lefthand side of the drawing, and has the chain drive in contact with the ground on the righthand side of the vehicle, the showing of the drawing being intended to clarify the distinction between the wheel and traction drives. To avoid confusion, it should be explained that the road wheel 14a on the righthand side of FIGURE 1 is not in contact with the traction drive, but is lifted above the road surface to be out of contact therewith when housing 20 is lowered. Each of the traction chain housings 19 and 20 is provided with a pair of sprocket wheels 29 and 30 and guide pulleys 31 over which a tractor chain 32 travels. The sprocket wheels 29 are mounted on drive axles 21 and 22, which are also the pivots for the track housings 19 and 20.

Figure 6:
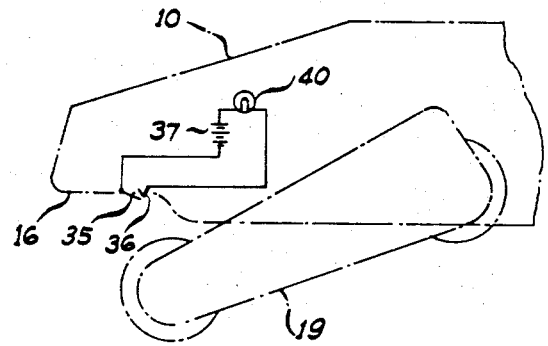
FIGURE 6 is a diagrammatic view of a light circuit in alignment to be actuated by the articulated track to indicate the position of the latter in relation to the vehicle body.

With reference to FIGURE 6 of the drawing, a pressure sensitive switch 35 is mounted in the path of movement of the traction housing 19 to be contacted thereby to close the circuit with contact 36 which, through a battery 37, energizes lamp 40 to indicate that the traction housing 19 is in its raised position for a purpose to be hereinafter described. Such a switch is at both the front and rear shoulders of the vehicle.

Figure 4:
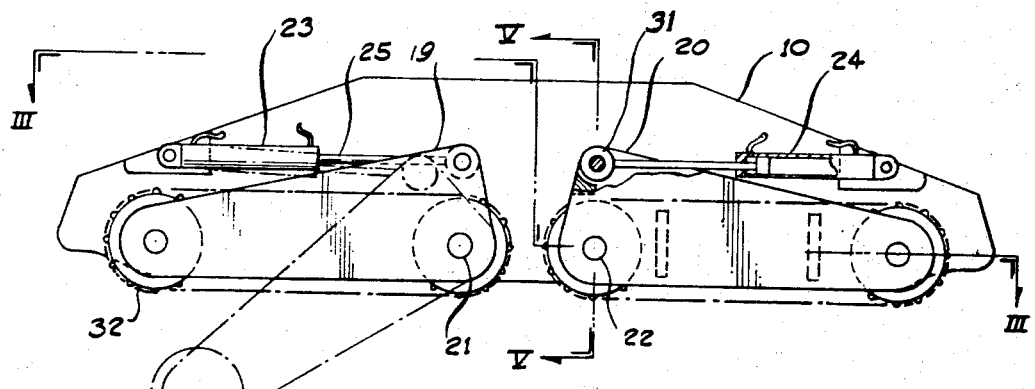
Figure 5:
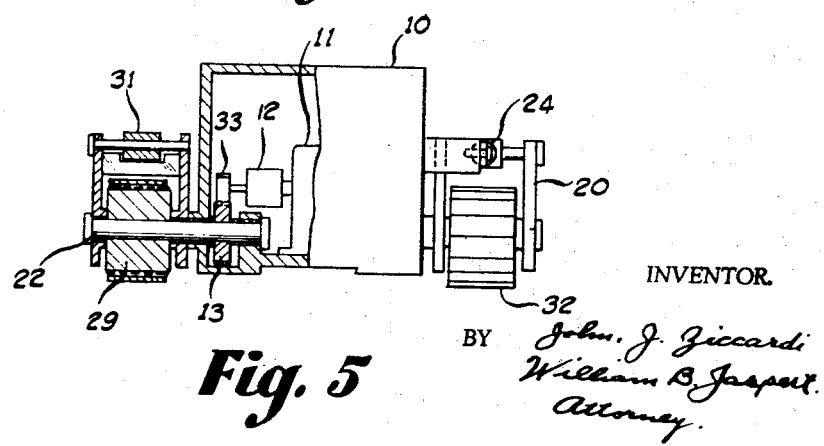

The vehicle may be used without the rubber traction wheels 15 by employing a straight track configuration, as shown in FIGURES 3, 4 and 5. The track housings are of triangular shape with the sprocket wheels 29 and 30 in horizontal alignment with lower edge of the track housings 19 and 20, no guide pulley 31 being used as in FIGURE 1. The drive axles 21 and 22 are also the pivots for the track housings 19 and 20.

Pivot bars 41 extend across the housing walls 19 and 20 and hydraulic actuators 23 and 24 are connected by pistons 25 to journal blocks 42 that engage bars 41. When the pistons 25 are actuated, the track housing frames 19 and 20 are subjected to angular movement about drive shafts 21 and 22, as shown in FIGURE 4. The track frames are suitably reinforced by cross members 44, as shown in FIGURE 3, to keep the chain tracks from spreading.

In FIGURE 8 of the drawings, the articulated mechanism consists of levers 45, only one of which is shown connected to brackets 46, the levers being actuated by cranks 47 through a transmission 48 driven by electric motors 49. The motors are connected by conductors 50 and 51 to a control circuit energized by batteries 52 and controlled by a switch 53. By throwing the switch in either direction, the cranks 47 can be made to operate in either direction to articulate the tracks generally designated by numerals 54 and 55. This control is for use if the vehicle is constructed as a toy, to manipulate the controls without touching the vehicle.

Figure 7:
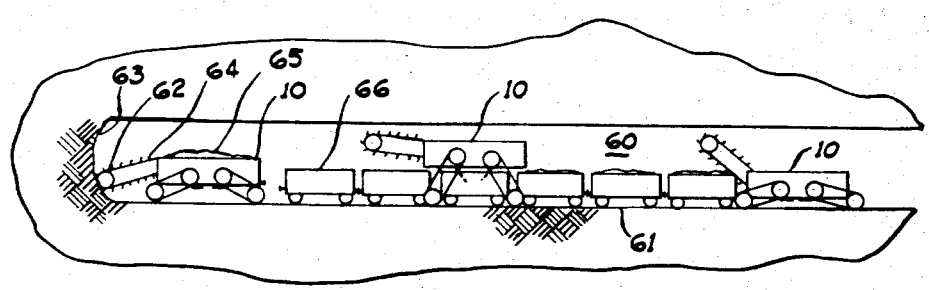
FIGURE 7 is a diagrammatic illustration of the articulated tracked vehicle as used in a coal mine for cutting and loading coal.

In FIGURE 7 of the drawing, the vehicle generally designated by the numeral 10, is shown in three positions in a coal mine having a working chamber generally designated by the numeral 60, and having rail tracks 61. The vehicle, because of its articulated traction devices, can assume a lowered position for applying a coal cutting mechanism 62 against a face or coal vein 63 with conveying means 64 for directing the coal into the vehicle 10 where it is piled up, as shown at 65. The vehicle can then be raised and moved backwards over the coal cars 66 to the car that is empty, which is shown in the center of FIGURE 7. The vehicle can be used to pull the cars toward the working end of the chamber 60, or it can be moved to the rear of the string of cars and lowered to pull them out of the mine, as shown at the righthand side of FIGURE 7.

Figure 10:
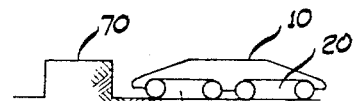
Figure 11:
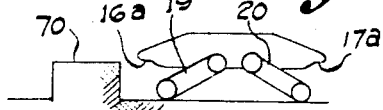
Figure 12:
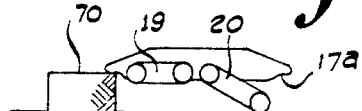
Figure 13:
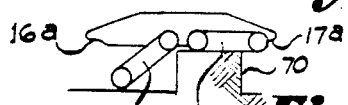
Figure 14:
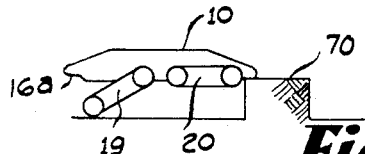
Figure 15:
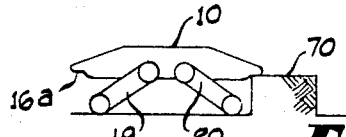
Figure 16:
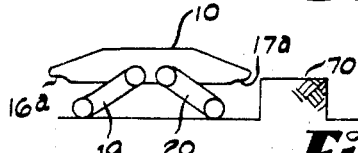
Figure 17:
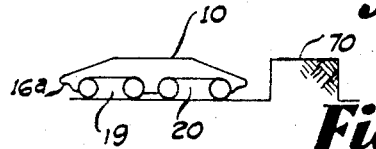

The function of the articulated tracks of the vehicle is illustrated in connection with FIGURES 10 through 17 of the drawing. In FIGURE 10, the vehicle approaches an obstacle designated by the numeral 70, having moved thereto on its road wheels 15. The vehicle is then raised, as shown in FIGURE 11, lifting the road wheels out of contact with the road surface and placing the traction frames or housings, which, for convenience, may be designated arms, in a down position with the seating face or nose 16a of the vehicle raised above the surface of the obstacle 70. The vehicle is then moved forward, by the rear traction device, as shown in FIGURE 12, and the front arms or traction devices are then raised to the horizontal position, as shown in FIGURE 12. The rear arms or traction members then push the vehicle forward to where the forward arms or traction members can be lowered, as shown in FIGURE 13. The traction devices then pull the vehicle over the top of the obstacle, as shown in FIGURE 14, until it passes over the curved shoulder 18, FIGURE 1, and rests on the rear supporting surface or face 17a, FIGURE 1, with the rear traction devices cleared of the obstacle 70. The rear traction elements are then lowered, as shown in FIGURE 15, so that the vehicle can be moved away from the obstacle, as shown in FIGURE 16, and again lowered to be in position for resting on the road wheels 15 to advance it in a forward direction, as shown by the arrows.

From the foregoing, it is evident that a traction vehicle with normal road traction gear and with separately operable articulated traction arms can be maneuvered to overcome obstacles such as conventional and normal traction devices are incapable of accomplishing. The endless tracks that pass over the sprocket drive and idler wheels, provides traction as in a conventional tracked vehicle.

It is further evident that a traction type vehicle of the hereinbefore described construction can ride through bogs by lowering the traction arms as well as climbing over obstacles as has been herein illustrated. Also, the controls and operating mechanisms made for the operation of the vehicle are of simple construction and mostly in conventional use on heavy tractor and automotive equipment.

Although the vehicle has been illustrated as a combined road wheeled drive and chain traction vehicle, it is evident from FIGURES 3, 4 and 5, that the traction drive with the articulated arms alone may be employed to carry out the operational characteristics herein illustrated and described. It is further evident that various modifications may be made in the details of construction without departing from the principles herein set forth.

I claim:

1. In a tracked vehicle, the combination of a vehicle body and a plurality of longitudinally spaced pivotally mounted track housings on each side thereof, said vehicle body having front and rear traction wheels mounted in fixed relation to the body on which the vehicle may be driven when the track housings are pivoted to an elevated position, each track housing having a frame of triangular configuration with one long side of said triangular housing facing upwardly, a drive sprocket on the upper apex of each housing with each housing being pivotally mounted on said vehicle about the axis of said drive sprocket, track support wheels at each remaining apex of said triangular housing, the lower side of said track housing extending below said fixed wheels when said lower side is in a horizontal position, separate actuator means connected to each track housing whereby each said housing may be selectively pivoted about said pivot axis to raise or lower said vehicle body with respect to a supporting surface or to operate said vehicle on said fixed traction wheels.

2. An articulated track vehicle as set forth in claim 1 in which the track housings are mounted to have their leading ends terminate short of the vehicle nose whereby the track housing can be angularly adjusted when the vehicle body rests on its nose.

3. An articulated track vehicle as set forth in claim 1 in which the track housings are provided with pivot arms for subjecting the housings to angular movement about their drive shafts, said pivot arms being connected to an actuator.

References Cited

UNITED STATES PATENTS

| 2,393,324 | 1/1946  | Joy _____ 180—22   |
| 3,057,319 | 10/1962 | Wagner _____ 180—9.32 X   |
| 3,182,741 | 5/1965  | Roach _____ 180—9.5    |
| 3,288,234 | 11/1966 | Feliz _____ 180—9.24 X  |
| 3,299,978 | 1/1967  | Sponsler _____ 180—9.52   |
| 3,351,037 | 11/1967 | Meili _____ 115—1    |

FOREIGN PATENTS 499,900   12/1919   France.

RICHARD J. JOHNSON, *Primary Examiner.*

U.S. Cl. X.R.

180—9.32, 9.52